United States Patent
Bae et al.

(10) Patent No.: US 10,284,691 B2
(45) Date of Patent: May 7, 2019

(54) METHOD AND APPARATUS FOR OPERATING TRANSMITTING AND RECEIVING NODES PROCESSING PACKET INCLUDING FIELD POSITION INFORMATION

(71) Applicant: Samsung Electronics Co., Ltd., Suwon-si (KR)

(72) Inventors: Young In Bae, Yongin-si (KR); Jae Hoon Kim, Yongin-si (KR); Do Jun Byun, Suwon-si (KR); Byoung Joon Lee, Seoul (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 15/148,986

(22) Filed: May 6, 2016

(65) Prior Publication Data

US 2016/0255180 A1   Sep. 1, 2016

Related U.S. Application Data

(63) Continuation of application No. PCT/KR2014/003917, filed on May 2, 2014.

(30) Foreign Application Priority Data

Nov. 6, 2013   (KR) .................. 10-2013-0134156

(51) Int. Cl.
*H04L 12/701*   (2013.01)
*H04L 12/741*   (2013.01)
(Continued)

(52) U.S. Cl.
CPC .............. *H04L 69/22* (2013.01); *H04L 45/74* (2013.01); *H04L 67/327* (2013.01)

(58) Field of Classification Search
CPC ........ H04L 45/00; H04L 67/327; H04L 69/22
See application file for complete search history.

(56) References Cited

U.S. PATENT DOCUMENTS 6,446,173 B1 *   9/2002   Pham .................... H04L 12/462
                                                                709/238
7,143,397 B2    11/2006   Imaura
(Continued)

FOREIGN PATENT DOCUMENTS

JP        2006-352530 A    12/2006
JP        4251725 B2        4/2009
(Continued)

OTHER PUBLICATIONS

International Search Report issued in counterpart International Application No. PCT/KR2014/003917 dated Aug. 18, 2014 (2 pages in English; 3 pages in Korean).

*Primary Examiner* — Scott M Sciacca
(74) *Attorney, Agent, or Firm* — NSIP Law (57) ABSTRACT

Disclosed are a method and corresponding apparatus to operate transmitting and receiving nodes processing a packet including field position information. The packet includes field position information. Provided is the method for operating a transmitting node, including generating a packet comprising location information indicating information about a location corresponding to a field in the packet, and transmitting the packet including the position information.

16 Claims, 7 Drawing Sheets

```
<Interest>
  <Name>
    <Component>sen</>
    <Component>vpc1-2213123</>
    <Component>test.txt </>
  </Name>
  <Exclude>
    <Component>FD2013</>
  </Exclude>
  <AOK>1</>
  <Nonce>982930</>
</Interest>
```
~110

130

| 26 | 14 | 15 | 3 | sen | 0 | 15 | 12 | vpc1-2213123 | 0 | 15 | 8 | test.txt | 0 | 0 |
| 43 | 15 | 6 | test.txt | 0 | 0 | 47 | 1 | 1 | 0 | 41 | 6 | 982930 | 0 | 0 |

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 2005/0165950 A1* | 7/2005 | Takagi | ............ | H04L 12/413 709/236 |
| 2008/0095149 A1 | 4/2008 | Dai | | |
| 2009/0086663 A1* | 4/2009 | Ho | ............ | H04W 40/32 370/328 |
| 2013/0060962 A1* | 3/2013 | Wang | ............ | H04L 67/327 709/238 |
| 2014/0023072 A1* | 1/2014 | Lee | ............ | H04L 45/742 370/389 |
| 2014/0023076 A1* | 1/2014 | Calo | ............ | H04L 45/34 370/392 |
| 2014/0173034 A1* | 6/2014 | Liu | ............ | H04L 67/1063 709/217 |
| 2015/0095514 A1* | 4/2015 | Yu | ............ | H04W 40/10 709/242 |
| 2015/0117452 A1* | 4/2015 | Mosko | ............ | H04L 47/365 370/392 |
| 2015/0120895 A1* | 4/2015 | Solis | ............ | H04L 45/74 709/223 |
| 2015/0120924 A1* | 4/2015 | Scott | ............ | H04L 69/22 709/225 |
| 2015/0373162 A1* | 12/2015 | Mosko | ............ | H04L 69/22 370/392 |
| 2016/0212457 A1* | 7/2016 | Kwon | ............ | H04N 21/236 |

FOREIGN PATENT DOCUMENTS

| | | |
|---|---|---|
| KR | 10-0419766 B1 | 2/2004 |
| KR | 10-0630128 B1 | 9/2006 |
| KR | 10-0922391 B1 | 10/2009 |
| KR | 10-2011-0125481 A | 11/2011 |
| KR | 10-1216728 B1 | 1/2013 |
| KR | 10-2013-0085524 A | 7/2013 |

* cited by examiner

| DTAG | Element Name |
|------|--------------|
| 13 | Any |
| 14 | Name |
| 15 | Component |
| 16 | Certificate |
| 17 | Collection |
| 18 | CompleteName |
| 19 | Content |
| 20 | SignedInfo |

```
typedef struct ccn_interest_header_offset_ {
        unsigned short type;
        unsigned short name;
        unsigned short exclude;
        unsigned short answer_origin_kind;
        unsigned short end;
} ccn_interest_header_offset_t;
```

METHOD AND APPARATUS FOR OPERATING TRANSMITTING AND RECEIVING NODES PROCESSING PACKET INCLUDING FIELD POSITION INFORMATION

CROSS-REFERENCE TO RELATED APPLICATION(S)

This application is a U.S. national stage application of International Application No. PCT/KR2014/003917 filed on May 2, 2014, which claims the benefit of Korean Patent Application No. 10-2013-0134156 filed on Nov. 6, 2013, in the Korean Intellectual Property Office, the entire disclosures of which are incorporated herein by reference for all purposes.

BACKGROUND

1. Field

The following description relates to a method and corresponding apparatus to define and process a packet including location information of a field, and an operating method and apparatus of a transmission node and a reception node to process the packet.

2. Description of Related Art

In a content-centric network (CCN), to support efficient distribution of content, content segments are stored in a content cache for each node. During data transmission, a node receives content from an intermediate node, in which the content is stored on a routing path, instead of receiving the content directly from a source. Accordingly, in the CCN, a phenomenon in which content requests are concentrated on a predetermined node, for example, the source or a server, may be prevented, and congestion in a core network may be reduced.

In response to a content request, to efficiently distribute content, a large number of nodes in a routing path may search for all content from corresponding caches.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of a transmission node, the method including: generating a packet including location information indicating information about a location corresponding to a field in the packet; and transmitting the packet.

The location information may include an offset value of a location in which the information that corresponds to the field starts in the packet.

The location information may further include field information defining the field.

The generating may include the location information in a header of the packet.

The packet may include a packet for a content-centric network (CCN) to, based on a name of the content, request a content, to respond to a content request, and to perform routing.

The field may have a variable length.

In response to a packet including location information being received, the method may further include casting the packet by directly moving the packet, using a pointer, based on a memory address, and directly pointing a field value, without executing a packet field.

In accordance with another embodiment, there is provided a method of a reception node, the method including: receiving a packet including location information indicating information about a location corresponding to a field in the packet; extracting the location information; and based on the location information, searching for required information.

The location information may include an offset value of a location in which the information that corresponds to the field starts in the packet.

The location information may further include field information defining the field.

The packet may include a packet for a content-centric network (CCN) to, based on a name of the content, request a content, to respond to a content request, and to perform routing.

The field may have a variable length.

In response to a packet including location information being received, the packet may be casted by directly moving the packet, using a pointer, based on a memory address, and directly pointing a field value, without executing a packet field.

In accordance with another embodiment, there is provided a computer program embodied on a non-transitory computer readable medium, the computer program being configured to control a processor to perform the method described above.

In accordance with an embodiment, there is provided an apparatus, including: a processor configuring a packet to include element fields, each including location information indicating information about a location corresponding to each of the element fields in the packet, and information fields including the information corresponding to each of the element fields.

The location information may include an offset value of a location in which the information that corresponds to each of the element fields starts in the packet.

Each of the element fields may further include field information defining each of the element fields.

The packet may include a packet for a content-centric network (CCN) to request a content to, based on a name of the content, respond to a content request and to perform routing.

Each of the information fields may have a variable length.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

In accordance with an embodiment, the term "node" refers to a customer apparatus and a networking device. The customer apparatus includes, for example, a user terminal, such as a smartphone, and the like, a smart television (TV), a personal computer (PC), a notebook computer, a robot cleaner, and the like. The networking device may include, for example, an access point (AP), a router, and other similar network devices. A "content-centric network (CCN)" may be an example of an information-centric network (ICN), that is, various networking schemes to fetch content based on a name of the content. The following description may be equally applied to the ICN, in addition to the CCN.

Additionally, the terms "transmission node" and "reception node" may refer to a content requester, a publisher, middle nodes in a route through which a content request packet is transferred, or a content provider. The content requester is, for example, a node requesting content or streaming content in a CCN, and a publisher is, for example, a node that first generates corresponding content. The content provider is configured to provide content requested by a content requester.

Figure 1:
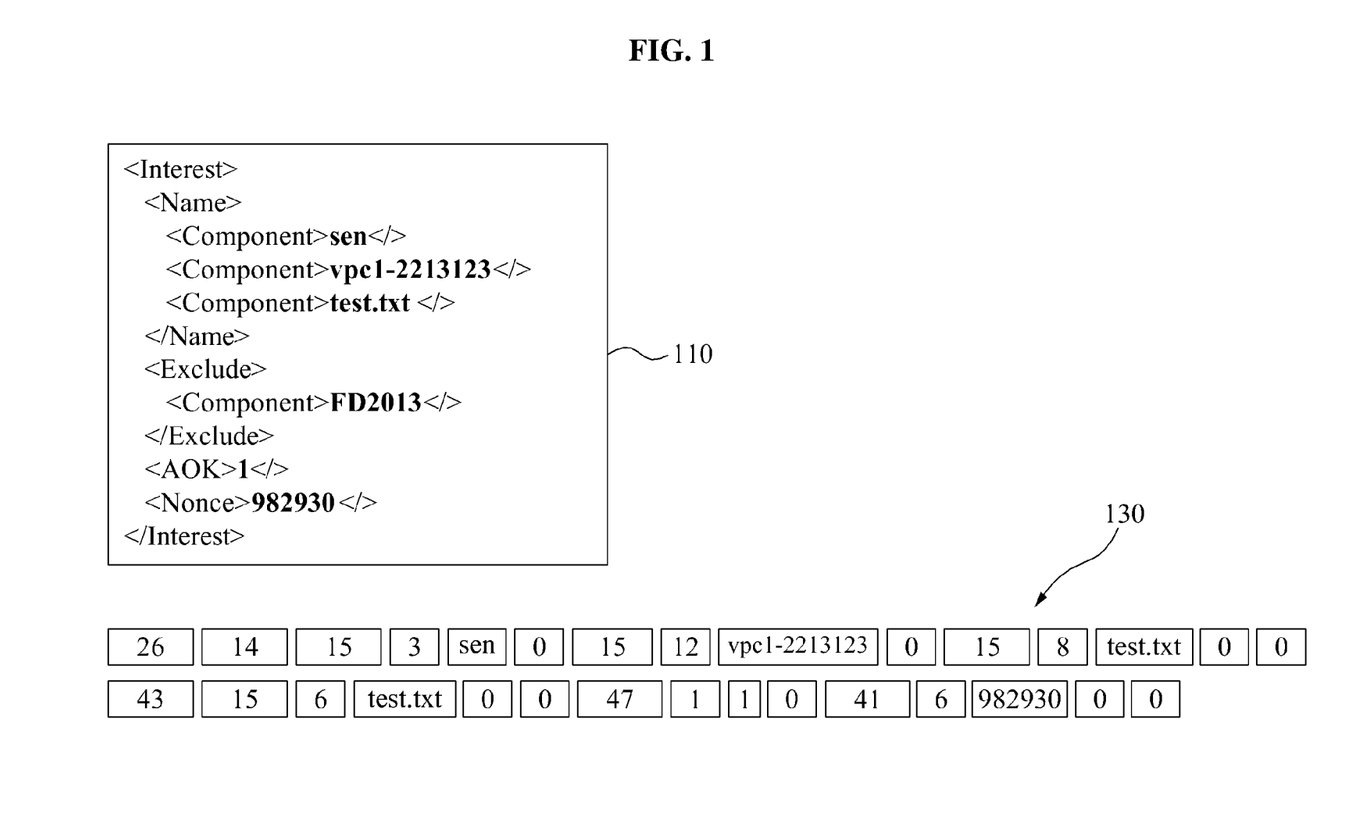
FIG. 1 is a diagram illustrating an example of a content-centric network architecture (CCNx) packet represented by extensible markup language (XML) coding, and in a binary form, in accordance with an embodiment.

FIG. 1 illustrates an example of a CCN architecture (CCNx) packet represented by extensible markup language (XML) coding, and in a binary form, in accordance with an embodiment.

Referring to FIG. 1, in an embodiment, a packet structure 110 of a CCNx that is currently published as an open source is represented in an XML format, and a packet structure 130 is represented in a binary format.

A large number of protocols each include a field with a fixed length. For example, an Internet protocol (IP) transfers a packet to a destination, using a destination address value of a length of 16 bytes.

In a CCN, routing is performed based on a content name with a variable length and, accordingly, a CCN packet may accommodate a variable-length field. In an example of a CCNx that is currently published as an open source, a packet structure employing an XML-based block-oriented encoding scheme, for example the packet structure 110, may be used to accommodate a CCN protocol having a variable-length address field.

For example, in a block-oriented encoding scheme for <Type><Length><Value><ending delimiter>, a field has a variable length and an overhead exists due to an element identification (ID) used to identify blocks, and ending delimiter bits. Additionally, by using the block-oriented encoding scheme, a decoding overhead occurs, because all packet streams are required to be sequentially examined to extract each of fields from the packet streams and to interpret or define each of the fields.

A packet structure of a CCNx represented in the XML format, for example, the packet structure 110, includes a variable-length field, for example, a Component field, and a Name field. In accordance with an embodiment, the packet structure 110 may include additional fields and there is no limitation to a number of variable-length fields that may be included in the packet structure 110. To identify information in each field, in one embodiment, each node requires to know information about a dictionary table in advance. The dictionary table will be described with reference to FIG. 2 below.

Figure 2:
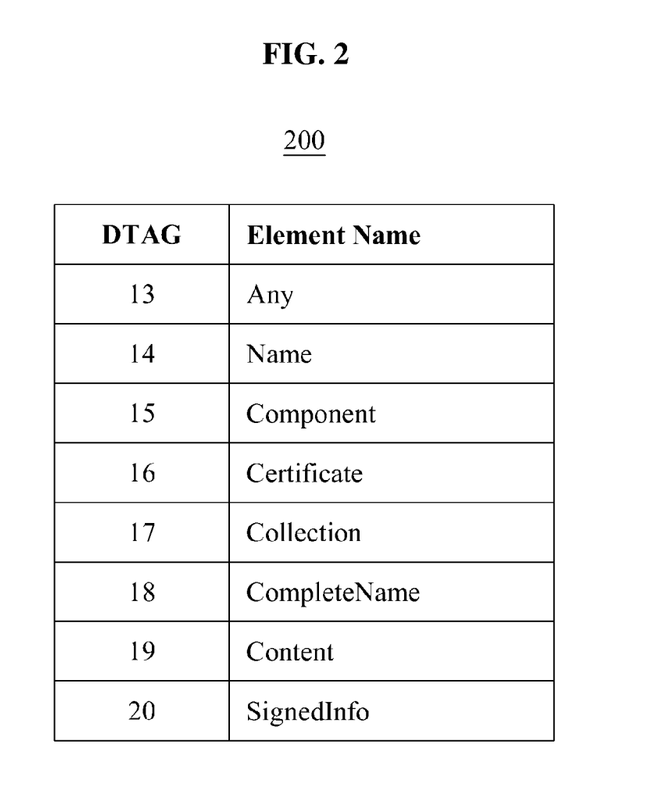
FIG. 2 is a diagram illustrating an example of a dictionary table used in a CCNx open source, in accordance with an embodiment.

The packet structure 130 of FIG. 1 in binary representation is obtained based on a dictionary table 200 of FIG. 2.

As shown in FIG. 1, in a first line of the packet structure 130, "26" included in a first field indicates a number of a corresponding interest packet, and "14" included in a second field indicates that the second field is a Name field, as shown in the dictionary table 200 of FIG. 2. Additionally, "15" included in a third field indicates that the third field is a Component field, and "3" included in a fourth field indicates that data or information corresponding to a corresponding component has a size of 3 bytes.

Furthermore, "sen" included in a fifth field indicates that data or information on a first component of the Name field, and "0" described in a sixth field indicates a delimiter. "15" included in a seventh field indicates that the seventh field is a Component field, and "12" included in an eighth field indicates a size of a second component of the Name field. In addition, "vpc1-2213123" included in a ninth field indicates data on the second component of the Name field. "0" included in a tenth field indicates a delimiter, "15" included in an eleventh field indicates that the eleventh field is a Component field, and "8" included in a twelfth field indicates that a third component of the Name field has a size of 8 bytes. "test.txt" included in a thirteenth field indicates data on the third component of the Name field, "0" included in a fourteenth field indicates a delimiter for the third component, and "0" included in a fifteenth field indicates a delimiter for a name component.

Similarly, in a second line of the packet structure 130, "43" included in a first field indicates an Exclude field, and "15" included in a second field indicates that the second field is a Component field. "6" included in a third field indicates a size of a component of an Exclude field, and "FD2013" included in a fourth field indicates data or information of an Exclude field.

As described above, when a block-oriented encoding scheme is used, desired data may be represented in a form of "<Type><Length><Value><ending delimiter>" and, accordingly, a large overhead may be present during decoding of a packet.

FIG. 2 illustrates an example of a dictionary table used in a CCNx open source, in accordance with an embodiment.

Referring to FIG. 2, the dictionary table 200 is used to identify fields in the CCNx open source.

The dictionary table 200 may be referred to as an "XML element ID Table."

In the dictionary table 200, a DTAG indicates a unique number or a unique tag number corresponding to each element field, and an element name indicates a name of each of the element fields.

For example, a unique number "14" indicates a field of a name element, and a unique number "15" indicates a field of a component element. As illustrated in the dictionary table 200, unique numbers may be correspondingly assigned to unique elements of each of element fields to avoid the elements fields from overlapping with each other. Thus, a beginning of a field in a CCNx packet may be successfully determined.

Figure 3:
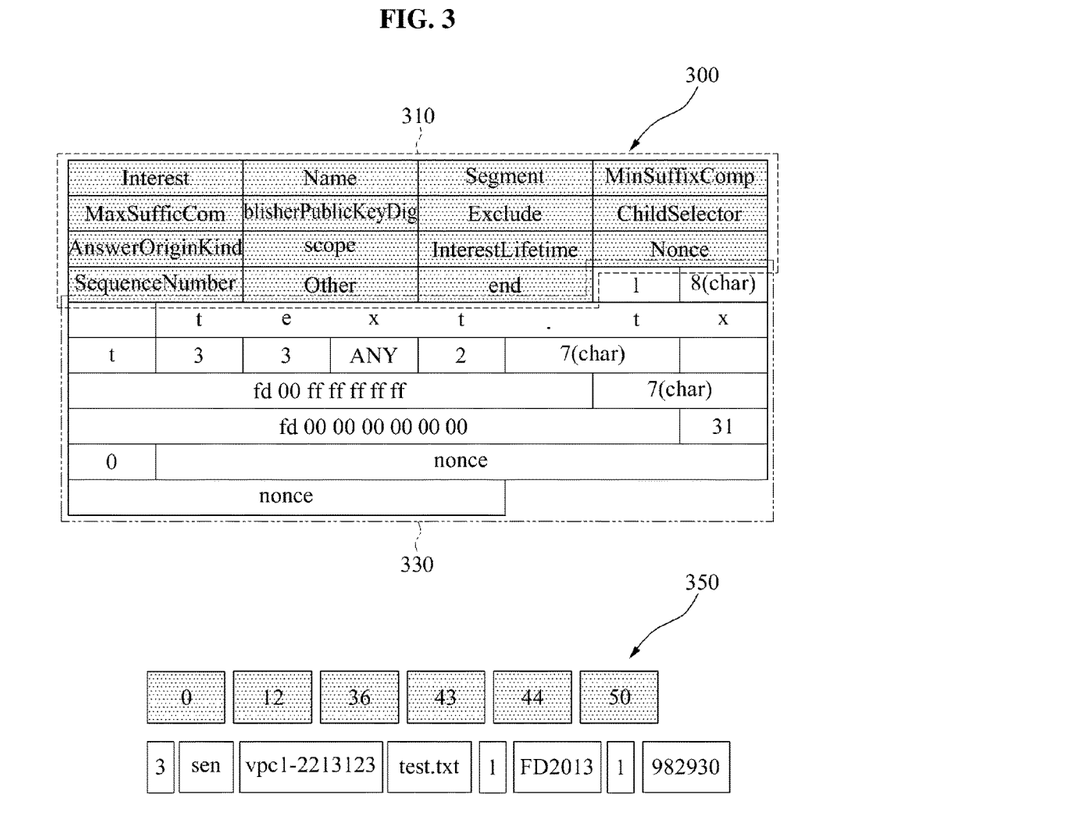
FIG. 3 is a diagram illustrating an example of a structure of an interest packet including location information of a field, and an example of an interest packet represented in a binary form, in accordance with an embodiment.

FIG. 3 illustrates an example of a structure of an interest packet including location information of a field, and an example of an interest packet represented in a binary form, in accordance with an embodiment.

As illustrated in FIG. 3, an interest packet including location information of a field has a structure 300, and a structure 350 that is represented in a binary form.

In various examples, a packet is an interest packet for a CCN to perform routing, to request content, and to respond to a content request, based on a name of the content.

In the structure 300 of the interest packet, each of a plurality of element fields 310 include location information indicating place information or location information that corresponds to each of the plurality of element fields 310 is positioned or located in the interest packet. Additionally, in the structure 300, information fields 330 include information corresponding to each of the plurality of element fields 310.

Each of the plurality of element fields 310 includes location information, that is, place information or location information that indicates where each of the plurality of element fields 310 is positioned or located in the interest packet. For example, in response to a packet including location information being received, each node casts the packet based on the structure 300 of FIG. 3, and directly points a field value, without operating or executing a packet field. In this example, the casting refers to directly moving the packet, using a pointer, based on a memory address. Additionally, the location information includes, for example, an offset value for a location in which information, corresponding to at least one field, starts in the packet.

Each of the plurality of element fields 310 may further include field information used to interpret, define, or process each of the plurality of element fields 310.

Based on the structure 300, the interest packet is represented, as illustrated in the structure 350, identically or similar to the packet structure 130 of FIG. 1. In one embodiment, the interest packet may be configured to be exactly the same as the packet structure 130. In another embodiment, the interest packet may be configured to have the same features as the packet structure 130 with additional features. In a further embodiment, the interest packet may selectively include some of the components illustrated in the packet structure 130 of FIG. 1.

In the structure 350, a first line indicates location information indicating a location or a position in which information corresponding to each of the plurality of element fields 310 is located in a packet.

In the first line of the structure 350, "0" indicates that a corresponding packet is an interest packet, and "12" indicates that information corresponding to a Name field starts in an offset 12. Additionally, "36" indicates that information corresponding to an Exclude field starts in an offset 36.

An order of information indicated by each of the plurality of element fields 310, for example, an Attribute field, a Name field, an Exclude field, an AnswerOriginKind (AOK) field, a Nonce field, an End field, and other similar fields of a corresponding packet may be set or defined in advance between nodes in a network. The Attribute field may indicate whether the corresponding packet is an interest packet or a content packet.

Additionally, in accordance with an embodiment, each of the plurality of element fields 310 also includes field information used to interpret, define, or process each of the plurality of element fields 310. The field information is used to interpret, define, or process to determine what a corresponding field indicates, and each of the nodes fluidly defines or interprets and processes a variable-length field based on the field information. For example, the field information may include a number, or information that is set in advance in an element field that indicates whether the element field is a Name field, or a Nonce field.

A second line of the structure 350 corresponds to the information fields 330 indicating information corresponding to each of fields, and each of the information fields 330 may have a variable length.

In the second line, "3" described in a first information field indicates that three components are included in a Name field next to the first information field. Additionally, "sen," "vpc1-2213123," and "test.txt" represent data or information of each of Name fields. "1" described in a fifth information field indicates that a single component is included in an Exclude field, and "FD2013" indicates information of an Exclude field. In addition, "1" described in a seventh information field indicates that a value of an AOK field is "1" byte, and "982930" indicates information of a Nonce field.

In an example, a packet is used that includes location information that indicates where information corresponding to a field is located in the packet. Such information included in the packet is configured in a form of "<Locator><Locator><Locator><Value><Value><Value>."

Accordingly, decoding overhead may be reduced, and the information in the packet may be extracted and used without a complex operation.

Figure 4:
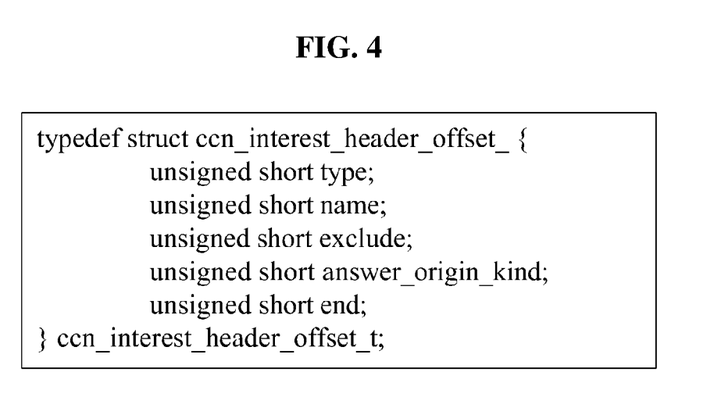
FIG. 4 is a diagram illustrating an example of coding to represent an offset order in an interest packet including location information of a field, in accordance with an embodiment.

FIG. 4 illustrates an example of coding to represent an offset order in an interest packet including location information of a field, in accordance with an embodiment.

FIG. 4 illustrates an offset order in an interest packet format of FIG. 3.

As illustrated in FIG. 4, an interest packet includes a Type field, a Name field, an Exclude field, an AOK field, an end field. Additional fields may be included in the interest packet in addition to those illustrated in FIG. 4. Furthermore, although the Type field, the Name field, the Exclude field, the AOK field, and the end field are described and illustrated with respect to FIG. 4, a person skilled in the art will appreciate that not all fields need to be included in the interest packet. Additionally, the interest packet may further include at least one of a Minimum Suffix Component field, a Maximum Suffix Component field, a Publisher Public Key Digest field, a Child Selector field, a scope field, a Lifetime field, and a Nonce field.

In this example, 26 bytes may be used as a structure to include location information in a packet. Among 26 bytes, 2 bytes may be used to represent an offset for each of the above fields included in the interest packet, and 2 bytes may be used to represent an ending offset.

A member of a structure is determined based on a type of fields that are required to be included in a packet, and a number of bits assigned for location information of a member is determined based on an expected size of an entire packet. In the example of FIG. 4, 2 bytes are assigned to each of fields to include location information of each of members, which reduce packet overhead by about 20%, compared to a block-oriented encoding scheme used in a typical CCNx.

Figure 5:
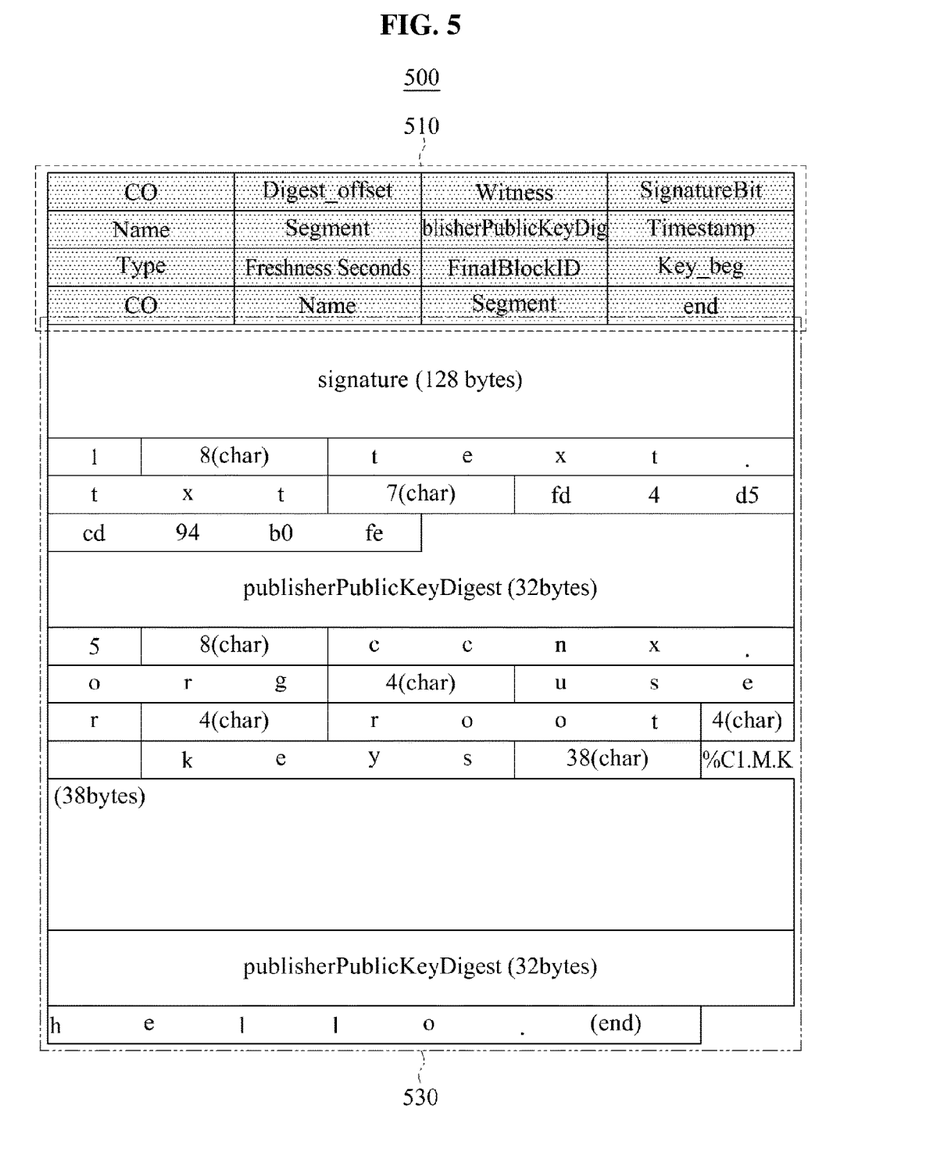
FIG. 5 is a diagram illustrating an example of a structure of a content packet including location information of a field, in accordance with an embodiment.

FIG. 5 illustrates an example of a structure of a content packet including location information of a field, in accordance with an embodiment.

FIG. 5 illustrates a structure 500 of a content packet including location information of a field. The structure 500 is represented using binary numbers. However, other numerical representation may be used to represent the structure 500.

In various examples, the content packet refers to a packet for a CCN to perform routing, to request content, and to respond to a content request, based on a name of the content.

Similarly to an interest packet, in the structure 500, a plurality of element fields 510 each include location information indicating location information or position information corresponding to each of the plurality of element fields 510 is located in the content packet. Additionally, information fields 530 include the information corresponding to each of the plurality of element fields 510.

Each of the plurality of element fields 510 includes location information, that is, position or location information that indicates a position or a location of each of the plurality of element fields 510 in the interest packet. For example, in response to a packet including location information being received, each of nodes casts the packet based on the structure 500, and directly points a field value, without an operation of a packet field. In this example, the location information includes, for example, an offset value for a location in which information corresponding to at least one field starts in the packet.

Each of the plurality of element fields 510 may further include field information used to interpret, define, or process each of the plurality of element fields 510.

Figure 6:
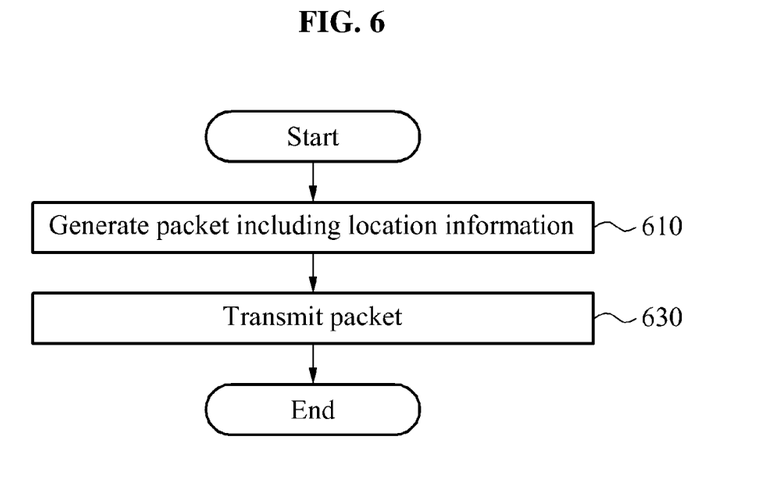
FIG. 6 is a flowchart illustrating an example of an operating method of a transmission node, in accordance with an embodiment.

FIG. 6 illustrates an example of an operating method of a transmission node, in accordance with an embodiment.

Referring to FIG. 6, in operation 610, the transmission node generates a packet including location information. For example, the transmission node generates the packet by including location information in a header of the packet.

The location information includes, for example, information indicating location information or position information corresponding to at least one field located in a packet. Each of the at least one field may have a variable length.

Additionally, the location information includes, for example, an offset value for a location in which information corresponding to at least one field starts or begins in a packet. In addition, the location information includes, for example, a variety of information indicating a location in which the information corresponding to the at least one field is stored.

The location information may further include field information used to interpret at least one field. The field information may be used to interpret, define, process, take to mean, or construe what at least one field indicates. Based on the field information, each node may fluidly interpret or define and process a variable-length field.

During generation of the packet, the transmission node may freely insert or delete the field information in or from the location information.

In operation 630, the transmission node transmits the packet, generated in operation 610, to other nodes.

Figure 7:
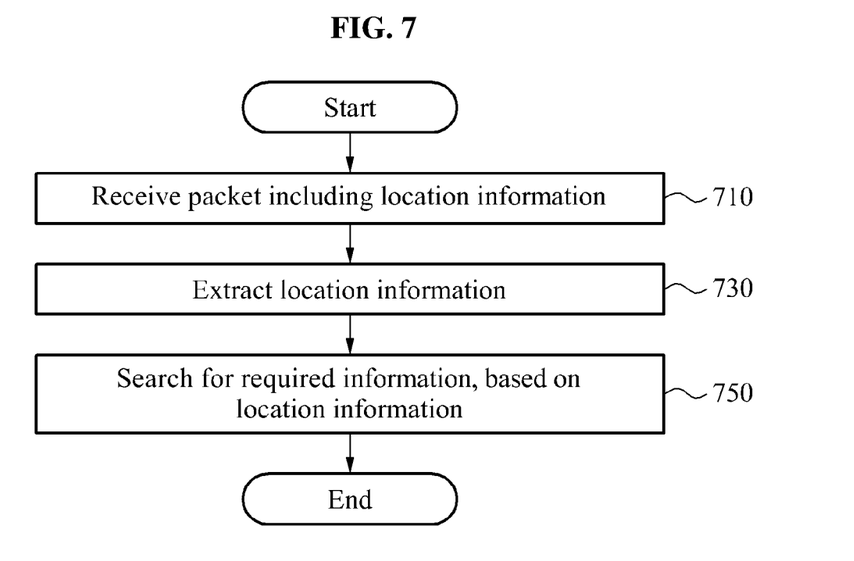
FIG. 7 is a flowchart illustrating an example of an operating method of a reception node, in accordance with an embodiment.

FIG. 7 illustrates an example of an operating method of a reception node, in accordance with an embodiment.

Referring to FIG. 7, in operation 710, the reception node receives a packet including location information indicating position information or location information corresponding to at least one field is located in the packet.

In operation 730, the reception node extracts the location information from the packet received in operation 710. The location information includes, for example, an offset value for a location in which the information corresponding to the at least one field starts in the packet. The location information may further include field information used to interpret, define, or process the at least one field. Each of the at least one field may have a variable length.

Based on the location information extracted in operation 730, in operation 750, the reception node searches for required information from the packet.

As described above, according to various examples, a packet may be configured to include location information indicating position information or location information of each field located in the packet and; thus, it is possible to reduce an overhead caused by decoding of the packet. Additionally, by configuring the packet as described above, it is possible to quickly access corresponding information when a field value is extracted, while permitting a value of a variable-length field. For example, the above-described scheme of configuring a packet may be efficiently used to decode a variable-length address in a protocol that requires quick decoding, for example, a protocol used in a transport layer of an open systems interconnection (OSI) 7-layer model.

The units, nodes, sources, and servers described herein may be implemented using hardware components software components and/or a combination thereof. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer.

Hardware components implemented by a processor or computer execute instructions or software, such as an operating system (OS) and one or more software applications that run on the OS, to perform the operations described herein with respect to FIGS. 6-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6-7 that perform the operations described herein with respect to FIGS. 6-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of a transmission node, the method comprising:
   generating a packet for a content-centric network (CCN) comprising consecutive locator fields, which indicate information about a location corresponding to respective fields in the packet, adjacent to consecutive value fields indicating data of corresponding fields; and
   transmitting the packet;
   wherein in response to a packet including location information being received, further comprising casting the packet by directly moving the packet, using a pointer, based on a memory address, and directly pointing a field value, without executing a packet field;
   wherein the location information comprises an offset value for a location in which information, corresponding to at least one field, starts in the packet, and
   wherein the packet is configured to, based on a name of a content, request the content, respond to the content request, and perform routing.

2. The method of claim 1, wherein the information comprises an offset value of a location in which the information that corresponds to the field starts in the packet.

3. The method of claim 1, wherein the information further comprises field information defining the field.

4. The method of claim 1, wherein the generating comprises including the information in a header of the packet.

5. The method of claim 1, wherein the field has a variable length.

6. A computer program embodied on a non-transitory computer readable medium, the computer program being configured to control a processor to perform the method of claim 1.

7. The method of claim 1, wherein the packet has a form of
<Locator><Locator><Locator><Value><Value><Value>.

8. A method of a transmission node, the method comprising:
- generating a packet comprising location information indicating information about a location corresponding to a field in the packet; and
- transmitting the packet,
- wherein in response to a packet including location information being received, further comprising casting the packet by directly moving the packet, using a pointer, based on a memory address, and directly pointing a field value, without executing a packet field;
- wherein the location information includes an offset value for a location in which information, corresponding to at least one field, starts in the packet, and
- wherein the packet is configured to, based on a name of a content, request the content, respond to the content request, and perform routing.

9. The method of claim 8, wherein the packet has a form of
<Locator><Locator><Locator><Value><Value><Value>.

10. A method of a reception node, the method comprising:
- receiving a packet for a content-centric network (CCN) comprising consecutive locator fields, which indicate information about a location corresponding to the respective fields in the packet, adjacent to consecutive value fields indicating data of corresponding fields;
- extracting the information; and
- based on the information, searching for required information;
- wherein in response to a packet including location information being received, further comprising casting the packet by directly moving the packet, using a pointer, based on a memory address, and directly pointing a field value, without executing a packet field;
- wherein the location information comprises an offset value for a location in which information corresponding to the field starts in the packet, and
- wherein the packet is configured to, based on a name of a content, request the content, respond to the content request, and perform routing.

11. The method of claim 10, wherein the information further comprises field information defining the field.

12. The method of claim 10, wherein the field has a variable length.

13. The method of claim 10, wherein in response to a packet including location information being received, the packet is casted by directly moving the packet, using a pointer, based on a memory address, and directly pointing a field value, without executing a packet field.

14. An apparatus, comprising:
- a processor;
- a memory storing instructions that, when executed by the processor, causes the processor to configure a packet for a content-centric network (CCN) to comprise consecutive locator fields, which indicate information about a location corresponding to respective fields in the packet, adjacent to consecutive value fields indicating data of corresponding fields, and information fields comprising the information corresponding to each of element fields, and
- in response to a packet including location information being received, casting the packet by directly moving the packet, using a pointer, based on a memory address, and directly pointing a field value, without executing a packet field;
- wherein the information comprises an offset value of a location in which the information corresponding to each of the locator fields starts in the packet, and
- wherein the packet is configured to, based on a name of a content, request the content, respond to the content request, and perform routing.

15. The apparatus of claim 14, wherein each of the value fields further comprises field information defining each of the value fields.

16. The apparatus of claim 14, wherein each of the information fields has a variable length.

* * * * *